US011284231B2

(12) United States Patent
Kuriyama

(10) Patent No.: US 11,284,231 B2
(45) Date of Patent: Mar. 22, 2022

(54) WIRELESS SENSOR SYSTEM, MANAGEMENT DEVICE, COMMUNICATION CONTROL METHOD AND COMMUNICATION CONTROL PROGRAM

(71) Applicant: SUMITOMO ELECTRIC INDUSTRIES, LTD., Osaka (JP)

(72) Inventor: Hiromitsu Kuriyama, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/755,863

(22) PCT Filed: Sep. 28, 2018

(86) PCT No.: PCT/JP2018/036375
§ 371 (c)(1),
(2) Date: Apr. 13, 2020

(87) PCT Pub. No.: WO2019/087639
PCT Pub. Date: May 9, 2019

(65) Prior Publication Data
US 2020/0304967 A1   Sep. 24, 2020

(30) Foreign Application Priority Data
Oct. 31, 2017   (JP) .............................. JP2017-210992

(51) Int. Cl.
*H04W 4/38*   (2018.01)
*H04B 7/155*   (2006.01)
(Continued)

(52) U.S. Cl.
CPC .............. *H04W 4/38* (2018.02); *H04B 7/155* (2013.01); *H04L 47/33* (2013.01); *H04W 16/26* (2013.01)

(58) Field of Classification Search
CPC ....... H04B 7/155; H04B 7/2606; H04L 41/00; H04L 43/00; H04L 47/33; H04L 67/12;
(Continued)

(56) References Cited

U.S. PATENT DOCUMENTS

| 2009/0059814 | A1 | 3/2009 | Nixon et al. | |
| 2010/0260240 | A1* | 10/2010 | Wang | ..................... H04B 7/026 375/214 |
| 2013/0021167 | A1* | 1/2013 | Harper, Jr. | ............... G05B 9/02 340/870.01 |

FOREIGN PATENT DOCUMENTS

| JP | 2003-018083 A | 1/2003 |
| JP | 2005-203991 A | 7/2005 |

(Continued)

OTHER PUBLICATIONS

"Ad Hoc;" Wikipedia; 2015; searched Aug. 16, 2017; http://ja.wikipedia.org/ad hoc.

*Primary Examiner* — Minh Trang T Nguyen
(74) *Attorney, Agent, or Firm* — Oliff PLC

(57) ABSTRACT

This wireless sensor system includes: one or a plurality of wireless terminal devices each configured to transmit data including sensor information indicating a result of measurement by a sensor; a management device; and a plurality of relay devices configured to relay the data received from the wireless terminal devices, to the management device or another relay device. Each of the relay devices transmits, to the management device, communication state information from one or a plurality of the wireless terminal devices to the relay device. On the basis of the communication state information received from each relay device, the management device transmits, to a relay device as a target, relay permissibility information that enables discernment, for each target terminal which is one or a plurality of the
(Continued)

wireless terminal devices, as to whether or not relay by the relay device of the data from the target terminal is permitted.

15 Claims, 15 Drawing Sheets

(51) Int. Cl.
*H04L 47/33* (2022.01)
*H04W 16/26* (2009.01)

(58) Field of Classification Search
CPC ..... H04Q 2209/30; H04Q 9/00; H04W 16/26; H04W 24/02; H04W 40/12; H04W 40/22; H04W 40/24; H04W 4/38; H04W 84/18; H04W 88/04
See application file for complete search history.

(56) References Cited

FOREIGN PATENT DOCUMENTS

| | | |
|---|---|---|
| JP | 2005-236632 A | 9/2005 |
| JP | 2009-111976 A | 5/2009 |
| JP | 2009-253359 A | 10/2009 |
| JP | 2010-035068 A | 2/2010 |
| JP | 2012-095023 A | 5/2012 |
| JP | 2013-197887 A | 9/2013 |
| JP | 2015-015585 A | 1/2015 |
| JP | 2015-043491 A | 3/2015 |

\* cited by examiner

FIG. 5

| SENSOR ID | LQI |
|---|---|
| 0001 | 180 |
| 0002 | 110 |
| 0003 | 200 |

FIG. 6

| SENSOR ID | RELAY DEVICE |
|---|---|
| 0001 | 151C |
| 0001 | 151D |
| 0002 | 151D |
| 0003 | 151B |
| 0003 | 151C |
| 0003 | 151D |

FIG. 11

| SENSOR ID | RELAY DEVICE | LQI |
|---|---|---|
| 0001 | 151A | 180 |
| 0001 | 151B | 150 |
| 0001 | 151C | 50 |
| 0001 | 151D | 40 |
| 0002 | 151A | 110 |
| 0002 | 151B | 60 |
| 0002 | 151C | 30 |
| 0002 | 151D | 20 |
| 0003 | 151A | 200 |
| 0003 | 151B | 150 |
| 0003 | 151C | 120 |
| 0003 | 151D | 60 |

FIG. 15

| SENSOR ID | RELAY DEVICE |
|---|---|
| 0001 | 151A |
| 0001 | 151B |
| 0002 | 151A |
| 0002 | 151B |
| 0002 | 151C |
| 0003 | 151A |

WIRELESS SENSOR SYSTEM, MANAGEMENT DEVICE, COMMUNICATION CONTROL METHOD AND COMMUNICATION CONTROL PROGRAM

TECHNICAL FIELD

The present invention relates to a wireless sensor system, a management device, a communication control method, and a communication control program.

The present application claims priority based on Japanese Patent Application No. 2017-210992 filed on Oct. 31, 2017, the entire contents of which are incorporated herein by reference.

BACKGROUND ART

"Wikipedia" [online], [searched on Aug. 16, 2017] on the Internet <URL: http://ja.wikipedia.org/ad hoc> (NON PATENT LITERATURE 1) describes a wireless ad hoc network. That is, in mobile communication used in mobile phones and the like, wireless base station devices and infrastructures such as fixed networks that connect wireless base station devices are indispensable. Meanwhile, in a wireless ad hoc network, each wireless terminal device autonomously performs routing to perform multi-hop communication. The wireless ad hoc network does not require a fixed network, and essentially, does not require such infrastructures. Therefore, simply by distributing wireless terminal devices in an environment in which to construct a network, and providing a state where the wireless terminal devices gather, the network can be constructed immediately.

CITATION LIST

Patent Literature

NON PATENT LITERATURE 1: "Wikipedia", [online], [searched on Aug. 16, 2017] on the Internet <URL: http://ja.wikipedia.org/ad hoc>

SUMMARY OF INVENTION (1) A wireless sensor system of the present disclosure includes: one or a plurality of wireless terminal devices each configured to transmit data including sensor information indicating a result of measurement by a sensor; a management device; and a plurality of relay devices configured to relay the data received from the wireless terminal devices, to the management device or another relay device. Each of the plurality of relay devices transmits, to the management device, communication state information indicating a state of communication from one or a plurality of the wireless terminal devices to the relay device. On the basis of the communication state information received from each relay device, the management device transmits, to a relay device as a target, relay permissibility information that enables discernment, for each target terminal which is one or a plurality of the wireless terminal devices, as to whether or not relay by the relay device of the data from the target terminal is permitted.

(13) A management device of the present disclosure includes: a reception processing unit configured to receive, from a plurality of relay devices, communication state information indicating a state of communication, the communication being from one or a plurality of wireless terminal devices to each relay device, each wireless terminal device being configured to transmit data including sensor information indicating a result of measurement by a sensor, each relay device being configured to relay, to the management device or another relay device, the data received; and a transmission processing unit configured to, on the basis of the communication state information received from each relay device, transmit, to a relay device as a target, relay permissibility information that enables discernment, for each target terminal which is one or a plurality of the wireless terminal devices, as to whether or not relay by the relay device of the data from the target terminal is permitted.

(14) A communication control method of the present disclosure is to be performed in a management device and includes the steps of: receiving, from a plurality of relay devices, communication state information indicating a state of communication, the communication being from one or a plurality of wireless terminal devices to each relay device, each wireless terminal device being configured to transmit data including sensor information indicating a result of measurement by a sensor, each relay device being configured to relay, to the management device or another relay device, the data received; and transmitting, on the basis of the communication state information received from each relay device, to a relay device as a target, relay permissibility information that enables discernment, for each target terminal which is one or a plurality of the wireless terminal devices, as to whether or not relay by the relay device of the data from the target terminal is permitted.

(15) A communication control program of the present disclosure is to be used in a management device and causes a computer to function as: a reception processing unit configured to receive, from a plurality of relay devices, communication state information indicating a state of communication, the communication being from one or a plurality of wireless terminal devices to each relay device, each wireless terminal device being configured to transmit data including sensor information indicating a result of measurement by a sensor, each relay device being configured to relay, to the management device or another relay device, the data received; and a transmission processing unit configured to, on the basis of the communication state information received from each relay device, transmit, to a relay device as a target, relay permissibility information that enables discernment, for each target terminal which is one or a plurality of the wireless terminal devices, as to whether or not relay by the relay device of the data from the target terminal is permitted.

One mode of the present disclosure can be realized as a wireless sensor system including such a characteristic processing unit, and can also be realized as a method having such a characteristic process as a step. In addition, one mode of the present disclosure can be realized as a semiconductor integrated circuit that realizes a part of or the entire wireless sensor system.

One mode of the present disclosure can be realized as a management device including such a characteristic processing unit, and can also be realized as a semiconductor integrated circuit that realizes a part of or the entire wireless terminal device.

BRIEF DESCRIPTION OF DRAWINGS

FIG. 5 shows an example of an LQI table in the relay device according to the first embodiment of the present disclosure.

FIG. 6 shows an example of relay permissibility information in the wireless sensor system according to the first embodiment of the present disclosure.

FIG. 11 shows an example of a management table in the management device according to the first embodiment of the present disclosure.

FIG. 15 shows an example of the relay permissibility information in the wireless sensor system according to the second embodiment of the present disclosure.

DESCRIPTION OF EMBODIMENTS

Figure 1:
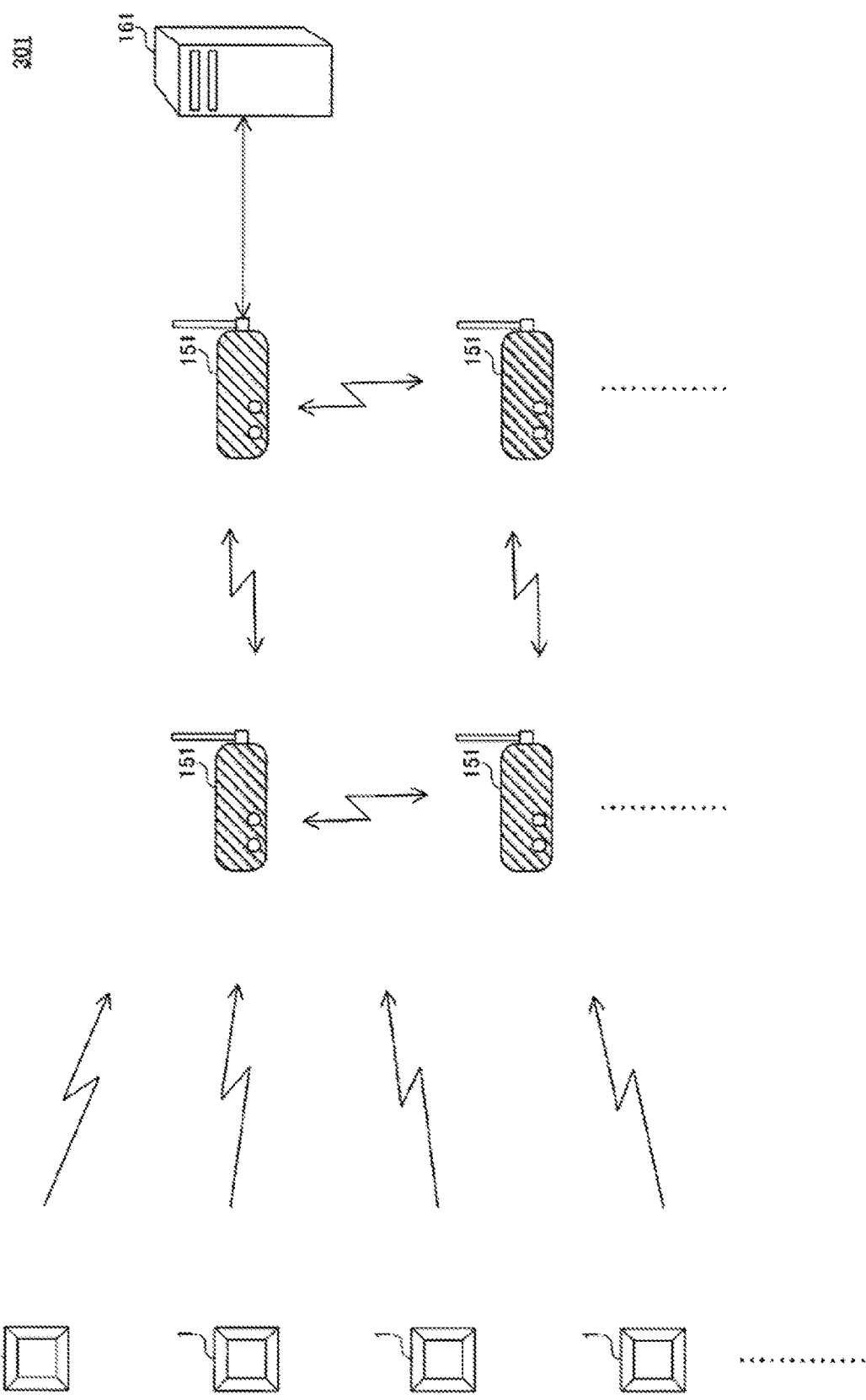
FIG. 1 shows a configuration of a wireless sensor system according to a first embodiment of the present disclosure.

Problems to be Solved by the Present Disclosure

When a packet is communicated between communication devices via a wireless ad hoc network, the packet is transmitted between the communication devices through a transmission path via one or a plurality of relay devices that relay the packet.

Such multi-hop communication is used not only in a wireless ad hoc network but also in a wired network, and is often used by a single application such as a smart meter for measuring electric power, for example.

In contrast to this, in an M2M (Machine to Machine) system expected to be increasingly used in the future, a configuration is conceivable in which a management device aggregates results of measurements by sensors. In such a configuration, a packet transmitted from a wireless terminal device is transmitted to the management device via one or a plurality of relay devices.

For example, when a plurality of relay devices receive data from the same sensor, traffic in the system is increased.

The present disclosure has been made in order to solve the above problem. An object of the present disclosure is to provide a wireless sensor system, a management device, a communication control method, and a communication control program that can suppress increase in traffic in a configuration in which data transmitted from a wireless terminal device is transmitted via one or a plurality of relay devices.

Effects of the Present Disclosure

According to the present disclosure, it is possible to suppress increase in traffic in a configuration in which data transmitted from a wireless terminal device is transmitted via one or a plurality of relay devices.

DESCRIPTION OF EMBODIMENT OF THE PRESENT DISCLOSURE

First, contents of embodiments of the present disclosure are listed and described.

(1) A wireless sensor system according to an embodiment of the present disclosure includes: one or a plurality of wireless terminal devices each configured to transmit data including sensor information indicating a result of measurement by a sensor; a management device; and a plurality of relay devices configured to relay the data received from the wireless terminal devices, to the management device or another relay device. Each of the plurality of relay devices transmits, to the management device, communication state information indicating a state of communication from one or a plurality of the wireless terminal devices to the relay device. On the basis of the communication state information received from each relay device, the management device transmits, to a relay device as a target, relay permissibility information that enables discernment, for each target terminal which is one or a plurality of the wireless terminal devices, as to whether or not relay by the relay device of the data from the target terminal is permitted.

In this configuration, a plurality of relay devices each transmit, to the management device, communication state information with respect to the wireless terminal devices, and, on the basis of each piece of the communication state information, the management device determines, for each wireless terminal device, whether or not relay of the data by each relay device is permitted. Therefore, a relay device for which the communication state is relatively good can be selected for each wireless terminal device, to relay the data. Thus, in a configuration in which data transmitted from a wireless terminal device is transmitted via one or a plurality of relay devices, increase in traffic can be suppressed.

(2) Preferably, the relay device relays the data received from another relay device, irrespective of the relay permissibility information.

With this configuration, the data received by a relay device for which the communication state is good is prevented from being discarded in another relay device. Thus, the data is allowed to reach the management device in a more assured manner.

(3) Preferably, the target terminal is the wireless terminal devices from which the data has been received by the relay device.

With this configuration, a wireless terminal device of which the communication state should be notified of to the management device can be appropriately selected, and traffic in the wireless sensor system can be suppressed.

(4) Preferably, the relay permissibility information indicates a wireless terminal device for which the data should not be relayed.

With this configuration, for example, in a case where a new wireless terminal device has been added to the wireless sensor system, until any relay device permitted to relay data from the wireless terminal device becomes discernable, relay devices having received data from the wireless terminal device can relay the data. Accordingly, even in an initial state where the content of relay permissibility information is insufficient, data is allowed to reach the management device.

(5) More preferably, the relay permissibility information indicates a combination, of the wireless terminal device and a relay device, for which the data should not be relayed.

With this configuration, when the relay permissibility information is transmitted to each relay device through multicast, the relay permissibility information in each relay device can be updated simultaneously.

(6) Preferably, the relay permissibility information indicates a wireless terminal device for which the data should be relayed.

With this configuration, for example, when a new wireless terminal device has been added to the wireless sensor system, only the relay device that has been permitted to relay data from the wireless terminal device relays the data. Therefore, the data from the new wireless terminal device received by a plurality of relay devices is prevented from being relayed, and increase in traffic can be suppressed.

(7) More preferably, the relay permissibility information indicates a combination, of the wireless terminal device and a relay device, for which the data should be relayed.

With this configuration, when the relay permissibility information is transmitted to each relay device through multicast, the relay permissibility information in each relay device can be updated simultaneously.

(8) Preferably, the relay permissibility information is information that enables recognition of a predetermined number of the relay devices that should relay the data and that have been determined on the basis of each piece of the communication state information.

Since the number of relay devices that are permitted to perform relaying is fixed, the process of selecting relay devices can be simplified.

(9) Preferably, on the basis of each piece of the communication state information, the management device determines, for each target terminal, the number of the relay devices that should relay the data.

With this configuration, for example, when the communication quality is good, the number of relay devices that are permitted to perform relaying is reduced to suppress traffic, and when the communication quality is bad, the number of relay devices that are permitted to perform relaying is increased to enhance the possibility of the data reaching the management device.

(10) Preferably, the management device does not transmit the relay permissibility information to a relay device for which one or a plurality of pieces of the communication state information satisfy a predetermined condition.

With this configuration, since the frequency of transmitting the relay permissibility information can be reduced, increase in traffic can be suppressed.

(11) Preferably, on the basis of a reception time of the communication state information, the management device determines whether or not to use the communication state information in creation or update of the relay permissibility information.

With this configuration, for example, in a case where a wireless terminal device has moved and a relay device permitted to perform relaying becomes no longer able to receive data from the wireless terminal device, the content of the relay permissibility information can be appropriately updated.

(12) Preferably, each wireless terminal device transmits a radio signal including the data and in a first frequency band through one-way communication, and each relay device transmits a radio signal including the data and in a second frequency band that is partially or entirely different from the first frequency band.

Thus, since the first frequency band to be used in transmission of a radio signal by the wireless terminal device, and the second frequency band to be used in transmission of a radio signal by the relay device are different from each other, radio-frequency interference between the relay device and the wireless terminal device can be suppressed. Accordingly, even in a case where a large number of wireless terminal devices and relay devices are provided without performing elaborate investigation, increase in data loss due to interference can be prevented.

(13) A management device according to an embodiment of the present disclosure includes: a reception processing unit configured to receive, from a plurality of relay devices, communication state information indicating a state of communication, the communication being from one or a plurality of wireless terminal devices to each relay device, each wireless terminal device being configured to transmit data including sensor information indicating a result of measurement by a sensor, each relay device being configured to relay, to the management device or another relay device, the data received; and a transmission processing unit configured to, on the basis of the communication state information received from each relay device, transmit, to a relay device as a target, relay permissibility information that enables discernment, for each target terminal which is one or a plurality of the wireless terminal devices, as to whether or not relay by the relay device of the data from the target terminal is permitted.

In this configuration, a plurality of relay devices each transmit, to the management device, communication state information with respect to the wireless terminal devices, and, on the basis of each piece of the communication state information, the management device determines, for each wireless terminal device, whether or not relay of the data by each relay device is permitted. Therefore, a relay device for which the communication state is relatively good can be selected for each wireless terminal device, to relay the data. Thus, in a configuration in which data transmitted from a wireless terminal device is transmitted via one or a plurality of relay devices, increase in traffic can be suppressed.

(14) A communication control method according to an embodiment of the present disclosure is to be performed in a management device and includes the steps of: receiving, from a plurality of relay devices, communication state information indicating a state of communication, the communication being from one or a plurality of wireless terminal devices to each relay device, each wireless terminal device being configured to transmit data including sensor information indicating a result of measurement by a sensor, each relay device being configured to relay, to the management device or another relay device, the data received; and transmitting, on the basis of the communication state information received from each relay device, to a relay device as a target, relay permissibility information that enables discernment, for each target terminal which is one or a plurality of the wireless terminal devices, as to whether or not relay by the relay device of the data from the target terminal is permitted.

In this configuration, a plurality of relay devices each transmit, to the management device, communication state information with respect to the wireless terminal devices, and, on the basis of each piece of the communication state information, the management device determines, for each wireless terminal device, whether or not relay of the data by each relay device is permitted. Therefore, a relay device for which the communication state is relatively good can be selected for each wireless terminal device, to relay the data. Thus, in a configuration in which data transmitted from a wireless terminal device is transmitted via one or a plurality of relay devices, increase in traffic can be suppressed.

(15) A communication control program according to an embodiment of the present disclosure is to be used in a management device and causes a computer to function as: a reception processing unit configured to receive, from a plurality of relay devices, communication state information indicating a state of communication, the communication being from one or a plurality of wireless terminal devices to each relay device, each wireless terminal device being configured to transmit data including sensor information indicating a result of measurement by a sensor, each relay device being configured to relay, to the management device or another relay device, the data received; and a transmission processing unit configured to, on the basis of the communication state information received from each relay device, transmit, to a relay device as a target, relay permissibility information that enables discernment, for each target terminal which is one or a plurality of the wireless terminal devices, as to whether or not relay by the relay device of the data from the target terminal is permitted.

In this configuration, a plurality of relay devices each transmit, to the management device, communication state information with respect to the wireless terminal devices, and, on the basis of each piece of the communication state information, the management device determines, for each wireless terminal device, whether or not relay of the data by each relay device is permitted. Therefore, a relay device for which the communication state is relatively good can be selected for each wireless terminal device, to relay the data. Thus, in a configuration in which data transmitted from a wireless terminal device is transmitted via one or a plurality of relay devices, increase in traffic can be suppressed.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

First Embodiment

FIG. 1 shows a configuration of a wireless sensor system according to a first embodiment of the present disclosure.

With reference to FIG. 1, a wireless sensor system 301 includes a plurality of sensor modules 1, a plurality of relay devices 151, and a management device 161.

Not limited to the configuration in which the wireless sensor system 301 includes a plurality of sensor modules 1, the wireless sensor system 301 may be provided with a single sensor module 1. In addition, not limited to the configuration in which the wireless sensor system 301 includes a plurality of relay devices 151, the wireless sensor system 301 may be provided with a single relay device 151.

Each relay device 151 is an access point, for example. The management device 161 is a server, for example.

The sensor module 1 operates using electric power from a battery, for example. The relay device 151 and the management device 161 operate using electric power from a power system, for example.

In the wireless sensor system 301, the plurality of relay devices 151 relay information transmitted from the sensor modules 1 to the management device 161.

Communication between a sensor module 1 and a relay device 151 is performed through one-way wireless communication. Communication between relay devices 151 is performed through wireless multi-hop communication.

Communication between the management device 161 and a relay device 151 is performed through wired communication, for example. Communication between the management device 161 and a relay device 151 may be performed through wireless communication.

For example, when the wireless sensor system 301 is used in an M2M system, the plurality of relay devices 151 relay sensor information indicating a result of measurement of a sensor module 1 including a sensor, and transmits the sensor information to the management device 161.

Problem

Figure 2:
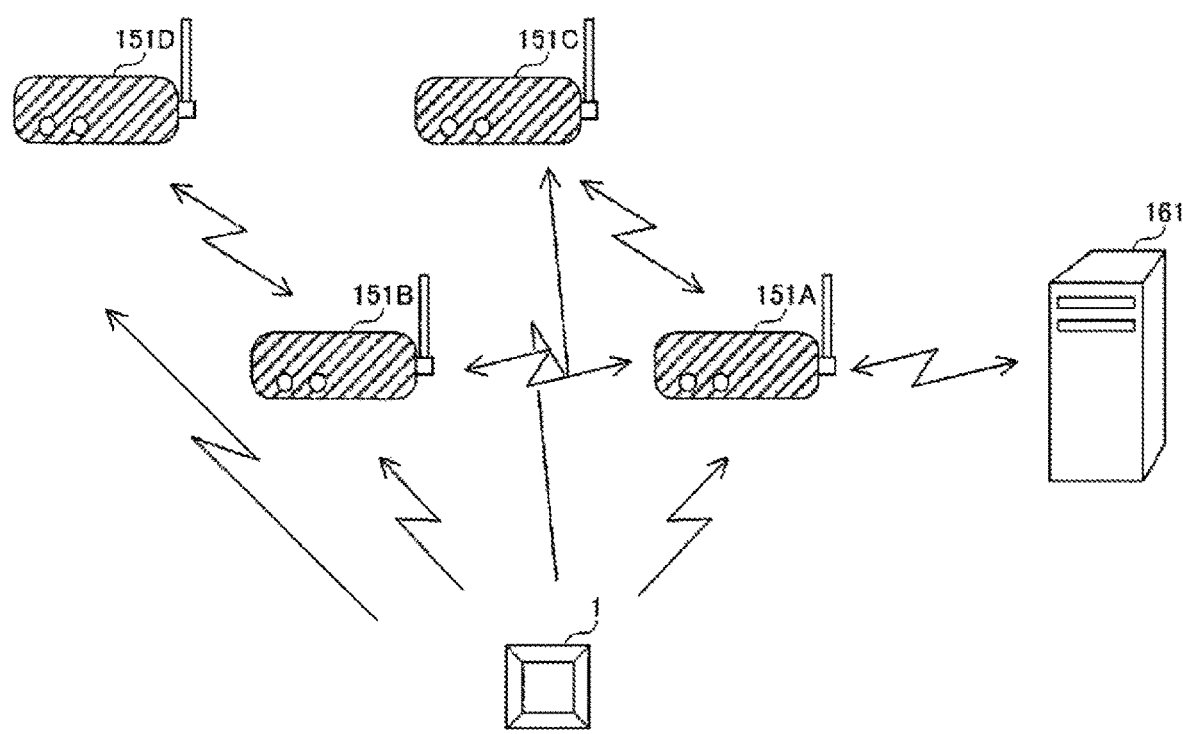
FIG. 2 is a diagram for describing increase in traffic in the wireless sensor system according to the first embodiment of the present disclosure.

FIG. 2 is a diagram for describing increase in traffic in the wireless sensor system according to the first embodiment of the present disclosure.

With reference to FIG. 2, a situation is assumed in which relay devices 151A, 151B, 151C, 151D, which are the relay devices 151, and a sensor module 1 are provided.

A radio signal transmitted from the sensor module 1 includes, for example, a packet that the relay device 151A should receive and relay. The sensor module 1 transmits a radio signal periodically or non-periodically.

In the example shown in FIG. 2, there are four paths along which sensor information from the sensor module 1 reaches the management device 161.

More specifically, there are a path along which the sensor information reaches the management device 161 via the relay device 151A, a path along which the sensor information reaches the management device 161 via a relay device 151B and the relay device 151A, a path along which the sensor information reaches the management device 161 via a relay device 151C and the relay device 151A, and a path along which the sensor information reaches the management device 161 via relay devices 151D, 151B and the relay device 151A.

Therefore, when a plurality of relay devices 151 receive the radio signal transmitted from the sensor module 1, traffic in the wireless sensor system 301 increases.

Thus, in the wireless sensor system according to the first embodiment of the present disclosure, such a problem is solved by the configurations and operations described below.

[Configuration of Sensor Module 1]

Figure 3:
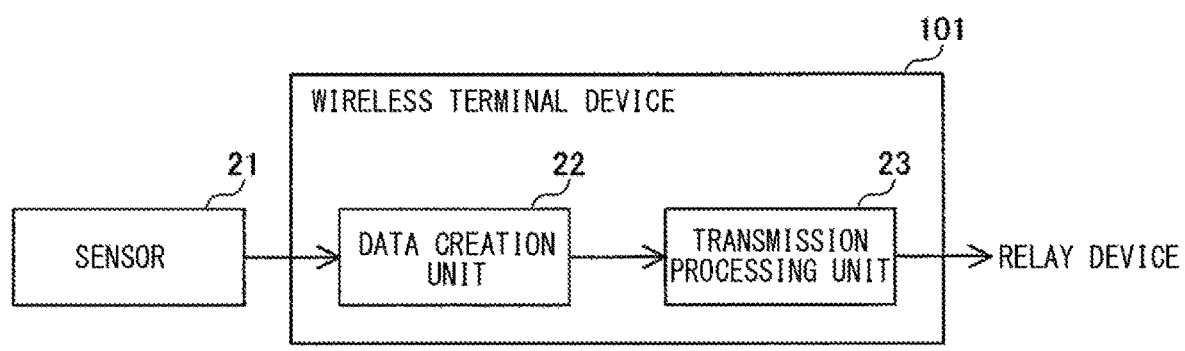
FIG. 3 shows a configuration of a sensor module in the wireless sensor system according to the first embodiment of the present disclosure.

FIG. 3 shows a configuration of the sensor module in the wireless sensor system according to the first embodiment of the present disclosure.

With reference to FIG. 3, the sensor module 1 includes a sensor 21 and a wireless terminal device 101. The wireless terminal device 101 includes a data creation unit 22 and a transmission processing unit 23.

The sensor 21 measures at least one of physical quantities such as temperature, humidity, current, acceleration, gyro value, and pressure, for example, and transmits an analog signal indicating the measured physical quantity, to the data creation unit 22.

The data creation unit 22 creates sensor data that includes sensor information indicating a result of measurement by the sensor 21 and an ID (hereinafter, also referred to as sensor ID) unique to the wireless terminal device 101 in the sensor module 1, for example, and outputs a packet including the created sensor data, to the transmission processing unit 23.

The transmission processing unit 23 generates a radio signal including the packet received from the data creation unit 22, and transmits the radio signal through one-way communication.

[Configuration of Relay Device 151]

Figure 4:
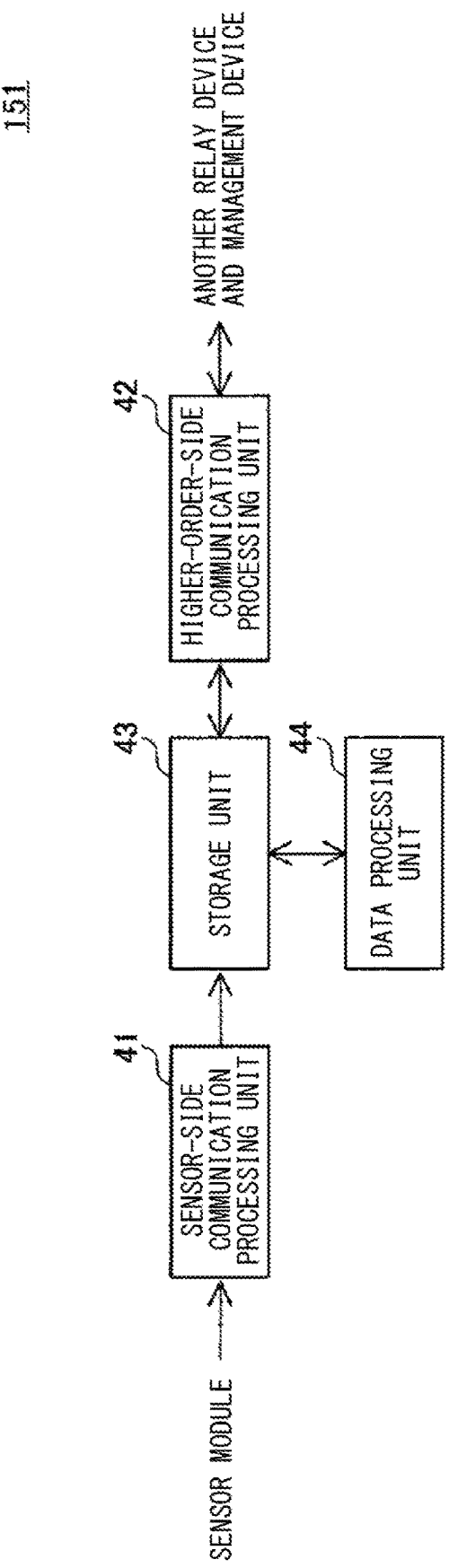
FIG. 4 shows a configuration of a relay device in the wireless sensor system according to the first embodiment of the present disclosure.

FIG. 4 shows a configuration of the relay device in the wireless sensor system according to the first embodiment of the present disclosure.

With reference to FIG. 4, the relay device 151 includes a sensor-side communication processing unit 41, a higher-order-side communication processing unit 42, a storage unit 43, and a data processing unit 44.

The relay device 151 periodically or non-periodically transmits sensor data included in a radio signal received from a wireless terminal device 101, to the management device 161 or another relay device 151.

In addition, the relay device 151 periodically or non-periodically transmits, to the management device 161 or another relay device 151, communication state information indicating the state of communication from the wireless terminal device 101 to the relay device 151.

More specifically, when receiving a radio signal from a sensor module 1, the sensor-side communication processing unit 41 in the relay device 151 measures an LQI (Link Quality Indication) at the time of the reception. The LQI indicates the quality of the radio signal and is an example of a measurement result regarding the radio signal.

The LQI takes a value in a range of 0 to 255. The greater the value of the LQI is, the higher the quality of the radio signal is.

The sensor-side communication processing unit 41 obtains sensor data from the packet included in the received radio signal, and stores the obtained sensor data into the storage unit 43.

The sensor-side communication processing unit 41 associates the sensor ID included in the sensor data with, for example, the measured LQI, and stores the associated sensor ID and LQI, as communication state information, into the storage unit 43.

Figure 5:
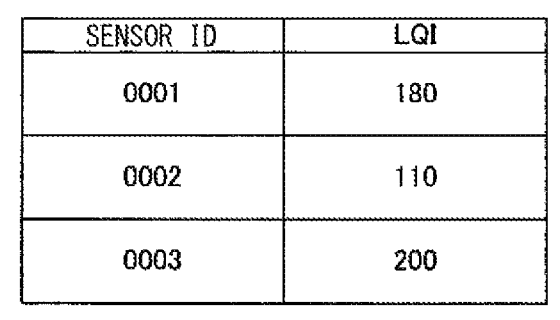

FIG. 5 shows an example of an LQI table in the relay device according to the first embodiment of the present disclosure.

With reference to FIG. 5, the LQI table is an example of the communication state information, and shows a correspondence relationship between the sensor ID and the LQI. Specifically, for example, in the relay device 151, the LQI of a sensor module 1 having 0001 as the sensor ID is 180, the LQI of a sensor module 1 having 0002 as the sensor ID is 110, and the LQI of a sensor module 1 having 0003 as the sensor ID is 200.

With reference to FIG. 4 again, when the higher-order-side communication processing unit 42 receives, from the management device 161, information (hereinafter, also referred to as relay permissibility information) that enables discernment as to whether or not relay of sensor data from sensor modules 1 is permitted, the higher-order-side communication processing unit 42 stores the relay permissibility information into the storage unit 43. For example, the relay permissibility information indicates a transmission source sensor module 1, i.e., a wireless terminal device 101, for which sensor data should not be relayed. Hereinafter, such relay permissibility information is also referred to as relay permissibility information A1.

Specifically, for example, the higher-order-side communication processing unit 42 of the relay device 151C receives, as the relay permissibility information A1, a packet that includes sensor IDs of 0001 and 0003, and stores the sensor IDs included in the received packet into the storage unit 43. On the basis of the stored relay permissibility information A1, the higher-order-side communication processing unit 42 determines whether or not relay of sensor data from sensor modules 1 is permitted.

When a sensor ID of sensor data stored in the storage unit 43 matches a sensor ID indicated in the relay permissibility information A1 stored in the storage unit 43, the data processing unit 44 deletes the sensor data.

Specifically, for example, the data processing unit 44 of the relay device 151C deletes the sensor data having 0001 as the sensor ID and the sensor data having 0003 as the sensor ID.

With reference to FIG. 4 again, the higher-order-side communication processing unit 42 obtains sensor data and communication state information from the storage unit 43, and generates a radio signal that includes the obtained sensor data and communication state information and that is in a second frequency band. The second frequency band does not overlap a first frequency band, i.e., the entirety of the second frequency band is different from the first frequency band. Then, the higher-order-side communication processing unit 42 transmits the radio signal.

Specifically, for the higher-order-side communication processing unit 42, a predetermined transmission channel in a 920 megahertz band (hereinafter, also referred to as relay channel) is set by a user, for example. The relay channel of the higher-order-side communication processing unit 42 is different from the channel used by the sensor module 1 (hereinafter, also referred to as terminal channel).

The relay device 151 receives, from another relay device 151, a radio signal including sensor data and communication state information. In this case, the relay device 151 relays the radio signal including the received sensor data and communication state information, irrespective of the relay permissibility information A1.

Specifically, when the higher-order-side communication processing unit 42 has received, from another relay device 151, a radio signal in the relay channel including sensor data and communication state information, the higher-order-side communication processing unit 42 obtains the sensor data and the communication state information included in the received radio signal, generates a radio signal again in the relay channel including the obtained sensor data and communication state information, and transmits the radio signal.

[Modification]

FIG. 6 shows an example of the relay permissibility information in the wireless sensor system according to the first embodiment of the present disclosure.

With reference to FIG. 6, the relay permissibility information may indicate a correspondence relationship between i.e., a combination of, a sensor ID and a relay device 151, for which sensor data from the sensor module 1 having the sensor ID should not be relayed. Hereinafter, such relay permissibility information is also referred to as relay permissibility information A2.

When having received the relay permissibility information A2 shown in FIG. 6 from the management device 161, the higher-order-side communication processing unit 42 stores the relay permissibility information A2 into the storage unit 43, and determines, on the basis of the stored relay permissibility information A2, whether or not relay of sensor data from sensor modules 1 is permitted.

In this case, when a combination that includes the relay device 151 to which the data processing unit 44 belongs is present in the relay permissibility information A2, the data processing unit 44 deletes sensor data that is stored in the storage unit 43 and of which the sensor ID matches the sensor ID in the combination.

Specifically, for example, the data processing unit 44 of the relay device 151C deletes sensor data having 0001 as the sensor ID and sensor data having 0003 as the sensor ID, and the data processing unit 44 of the relay device 151D deletes sensor data having 0001 to 0003 as the sensor IDs.

The higher-order-side communication processing unit 42 may create relay permissibility information A1 by extracting, from the received relay permissibility information A2, sensor IDs corresponding to the relay device 151 to which the higher-order-side communication processing unit 42 belongs, and store the created relay permissibility information A1 into the storage unit 43. In this case, on the basis of the stored relay permissibility information A1, the higher-order-side communication processing unit 42 determines whether or not relay of sensor data form sensor modules 1 is permitted.

Figure 7:
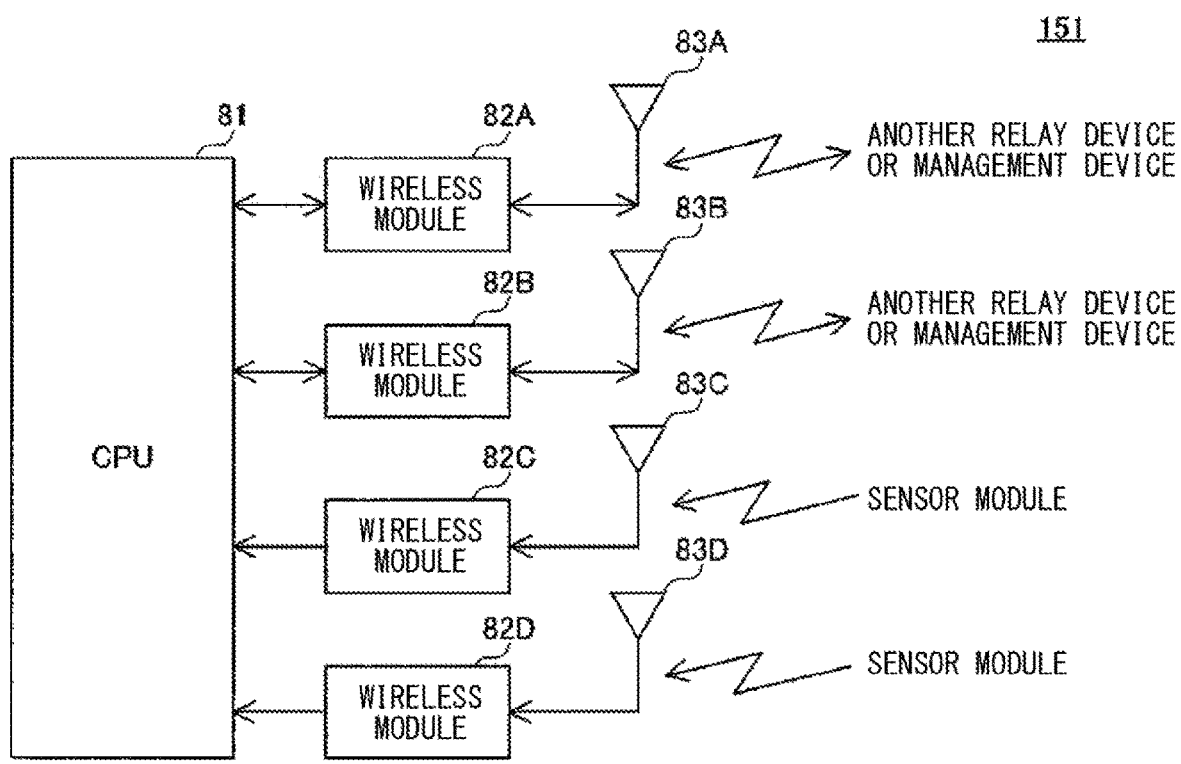
FIG. 7 shows an example of a hardware configuration of the relay device in the wireless sensor system according to the first embodiment of the present disclosure.

FIG. 7 shows an example of a hardware configuration of the relay device in the wireless sensor system according to the first embodiment of the present disclosure.

With reference to FIG. 7, the relay device 151 includes a CPU (Central Processing Unit) 81, wireless modules 82A, 82B, 82C, 82D, and antennas 83A, 83B, 83C, 83D. Hereinafter, each of the wireless modules 82A, 82B, 82C, 82D may be referred to as a wireless module 82.

The CPU 81 realizes the sensor-side communication processing unit 41 and the higher-order-side communication processing unit 42.

The wireless modules 82A and 82B each receive a radio signal transmitted from another relay device 151 via the corresponding antenna 83A and 83B. At this time, the wireless modules 82A and 82B each measure the LQI.

The wireless modules 82C and 82D each receive a radio signal transmitted from a sensor module 1 via the corresponding antennas 83C and 83D. At this time, the wireless modules 82C and 82D each measure the LQI.

Each wireless module 82 outputs sensor data included in the received radio signal and the measured LQI, to the CPU 81.

For example, the CPU 81 selects the greater measured LQI from among the measured LQIs and the sensor data received from the wireless modules 82A and 82B, and generates the above-described communication state information from the selected LQI.

Then, the CPU 81 stores the generated communication state information and the corresponding sensor data into the storage unit 43.

In addition, for example, the CPU 81 selects the greater measured LQI from among the sensor data received from the wireless modules 82C and 82D and the measured LQIs, and generates the above-described communication state information from the selected LQI.

Then, the CPU 81 stores the generated communication state information and the corresponding sensor data into the storage unit 43.

The CPU 81 takes out sensor data and the above-described communication state information from the storage unit 43, and outputs the sensor data and the communication state information to the wireless modules 82A and 82B.

The wireless modules 82A and 82B generate radio signals including the selected sensor data and the communication state information received from the CPU 81, and transmit the radio signals via the corresponding antennas 83A and 83B, to another relay device 151 or the management device 161.

Figure 8:
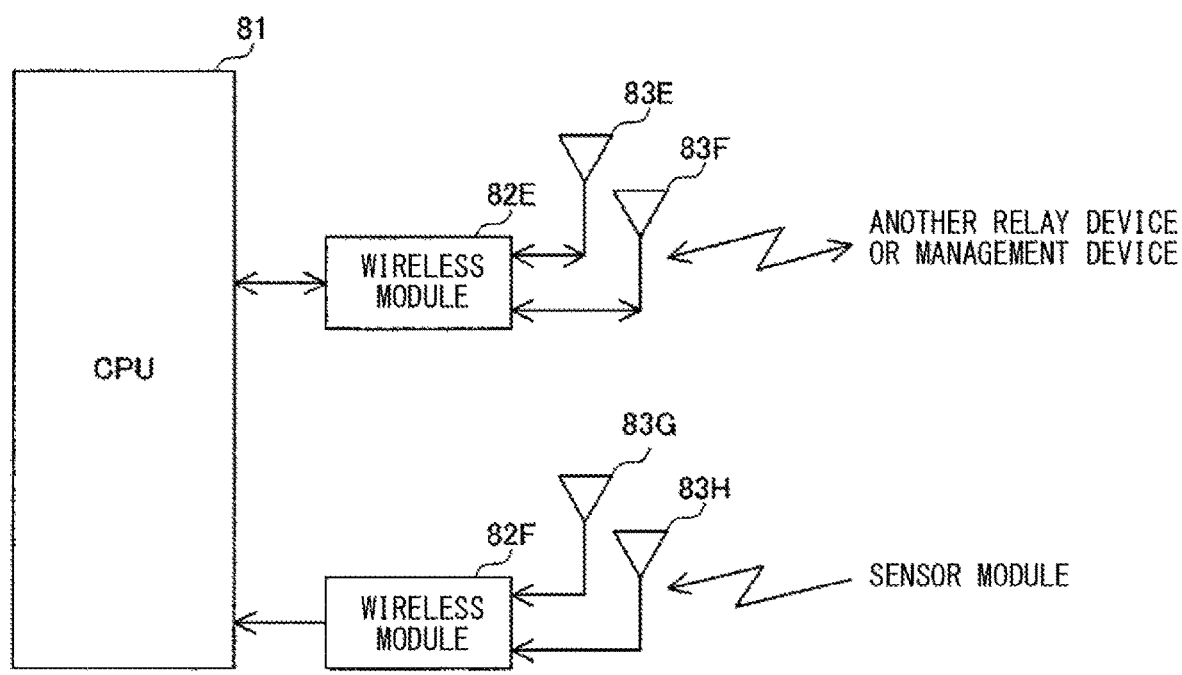
FIG. 8 shows another example of the hardware configuration of the relay device in the wireless sensor system according to the first embodiment of the present disclosure.

FIG. 8 shows another example of the hardware configuration of the relay device in the wireless sensor system according to the first embodiment of the present disclosure.

With reference to FIG. 8, the relay device 151 includes the CPU 81, wireless modules 82E, 82F, and antennas 83E, 83F, 83G, 83H.

The wireless module 82E receives, via the corresponding antennas 83E and 83F, a radio signal transmitted from another relay device 151. At this time, the wireless module 82E measures the LQI.

The wireless module 82F receives, via the corresponding antennas 83G and 83H, a radio signal transmitted from a sensor module 1. At this time, the wireless module 82F measures the LQI.

For example, the wireless module 82E selects the greater one of the measured LQIs, and outputs sensor data included in the radio signal and the measured LQI that is selected, to the CPU 81.

For example, the wireless module 82F selects the greater one of the measured LQIs, and outputs sensor data included in the radio signal and the measured LQI that is selected, to the CPU 81.

The CPU 81 generates the above-described communication state information on the basis of the LQI out of the sensor data and the LQI received from the wireless module 82E or 82F, and stores the sensor data and the communication state information into the storage unit 43.

The CPU 81 takes out sensor data and the above-described communication state information from the storage unit 43, and outputs the sensor data and the communication state information to the wireless module 82E.

The wireless module 82E generates a radio signal including the sensor data and the communication state information received from the CPU 81, and transmits the radio signal via the corresponding antenna 83E and 83F, to another relay device 151 or the management device 161.

[Configuration of Management Device 161]

Figure 9:
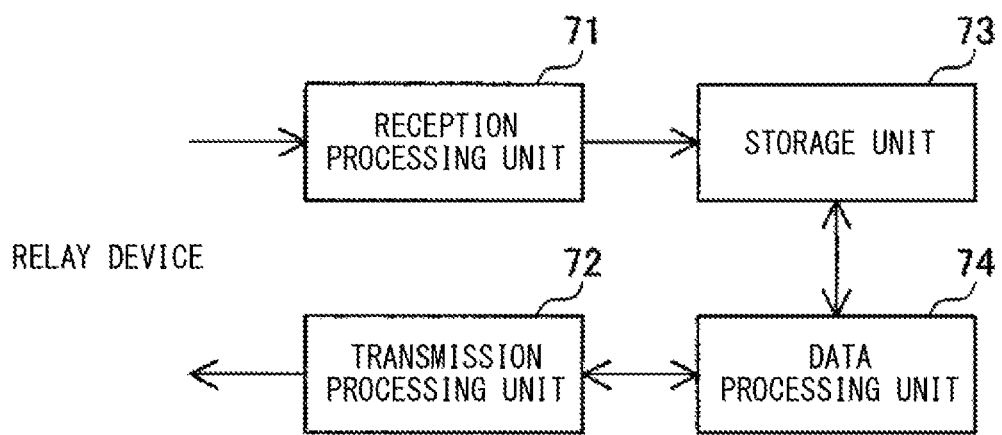
FIG. 9 shows a configuration of a management device in the wireless sensor system according to the first embodiment of the present disclosure.

FIG. 9 shows a configuration of the management device in the wireless sensor system according to the first embodiment of the present disclosure.

With reference to FIG. 9, the management device 161 includes a reception processing unit 71, a transmission processing unit 72, a storage unit 73, and a data processing unit 74.

On the basis of the communication state information received from each relay device 151, the management device 161 transmits, to a target relay device 151, relay permissibility information for each of a part or all of the sensor modules 1.

More specifically, in the management device 161, the reception processing unit 71 receives the communication state information from each relay device 151, and stores the communication state information into the storage unit 73.

On the basis of each piece of the communication state information in the storage unit 73, i.e., on the basis of the communication state information created in each relay device 151, the data processing unit 74 creates or updates relay permissibility information that enables discernment as to whether or not relay by the relay device 151 of sensor data from sensor modules 1 is permitted, and stores the relay permissibility information into the storage unit 73.

A target terminal for which the relay permissibility information is to be created or updated is the wireless terminal device 101 from which the relay device 151 has received the sensor data, for example.

The data processing unit 74 outputs the created or updated relay permissibility information to the transmission processing unit 72.

The transmission processing unit 72 transmits, to a target relay device 151, the relay permissibility information received from the data processing unit 74.

[Operation Flow]

Each device in the wireless sensor system 301 includes a computer. An arithmetic processing unit such as a CPU in the computer reads out a program including part or all of steps in the flow chart described below, from a memory (not shown), and executes the program. The programs for the plurality of devices can be installed from outside. The programs for the plurality of devices are each distributed in a state of being stored in a storage medium.

Figure 10:
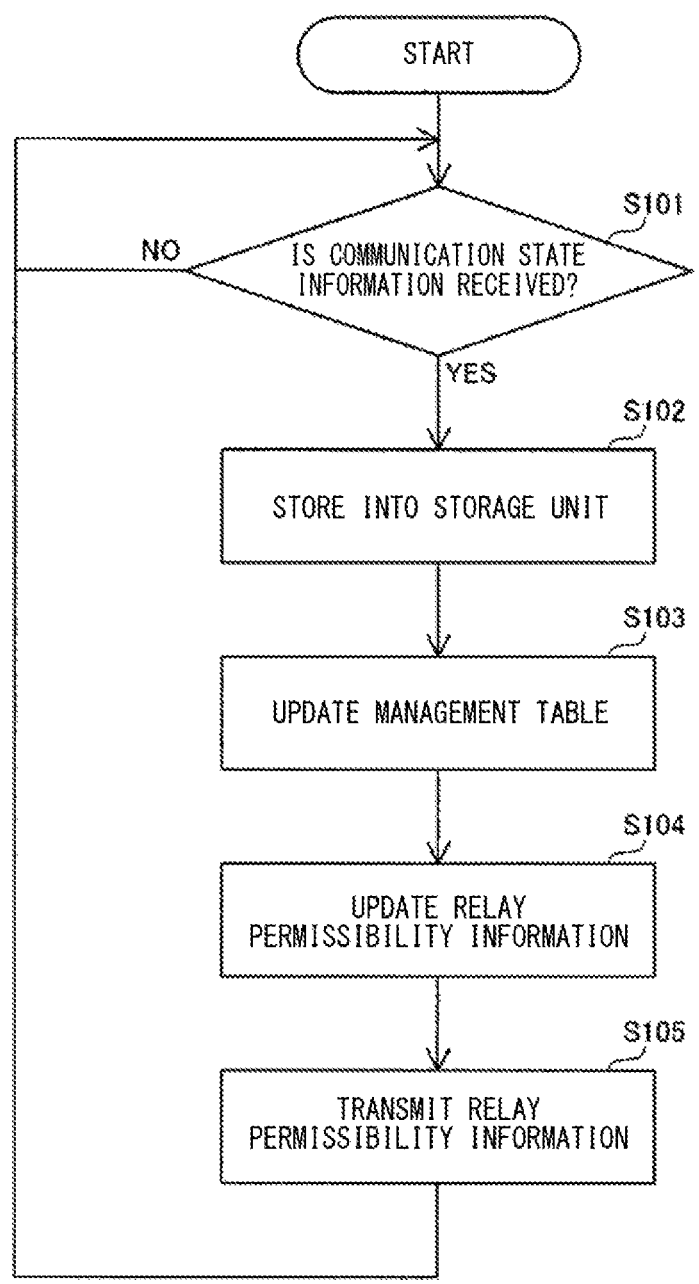
FIG. 10 is a flow chart describing an operation procedure according to which the management device of the first embodiment of the present disclosure updates relay permissibility information and transmits the relay permissibility information to each relay device.

FIG. 10 is a flow chart describing an operation procedure according to which the management device of the first embodiment of the present disclosure updates relay permissibility information and transmits the relay permissibility information to each relay device.

With reference to FIG. 9 and FIG. 10, first, in the management device 161, when the reception processing unit 71 has received communication state information from a relay device 151, for example (YES in step S101), the reception processing unit 71 attaches a time stamp indicating the reception time, to the received communication state information, and stores the communication state information into the storage unit 73 (step S102).

FIG. 11 shows an example of a management table in the management device according to the first embodiment of the present disclosure.

With reference to FIG. 11, the management table shows a correspondence relationship between the sensor ID, the relay device 151, and the LQI. Specifically, for example, in the management table, as for the sensor module having 0001 as the sensor ID, the LQI in the relay device 151A is 180, the LQI in the relay device 151B is 150, the LQI in the relay device 151C is 50, and the LQI in the relay device 151D is 40.

With reference to FIG. 9 and FIG. 10 again, next, the data processing unit 74 updates the management table using the communication state information newly stored in the storage unit 73 (step S103).

At this time, on the basis of the reception time of the communication state information, the management device 161 determines whether or not to use the communication state information in updating the relay permissibility information.

Specifically, the data processing unit 74 deletes, from the storage unit 73, communication state information of which the time stamp has not been changed for a certain period.

Next, the data processing unit 74 performs an update process of the relay permissibility information on the basis of the updated management table (step S104).

Figure 12:
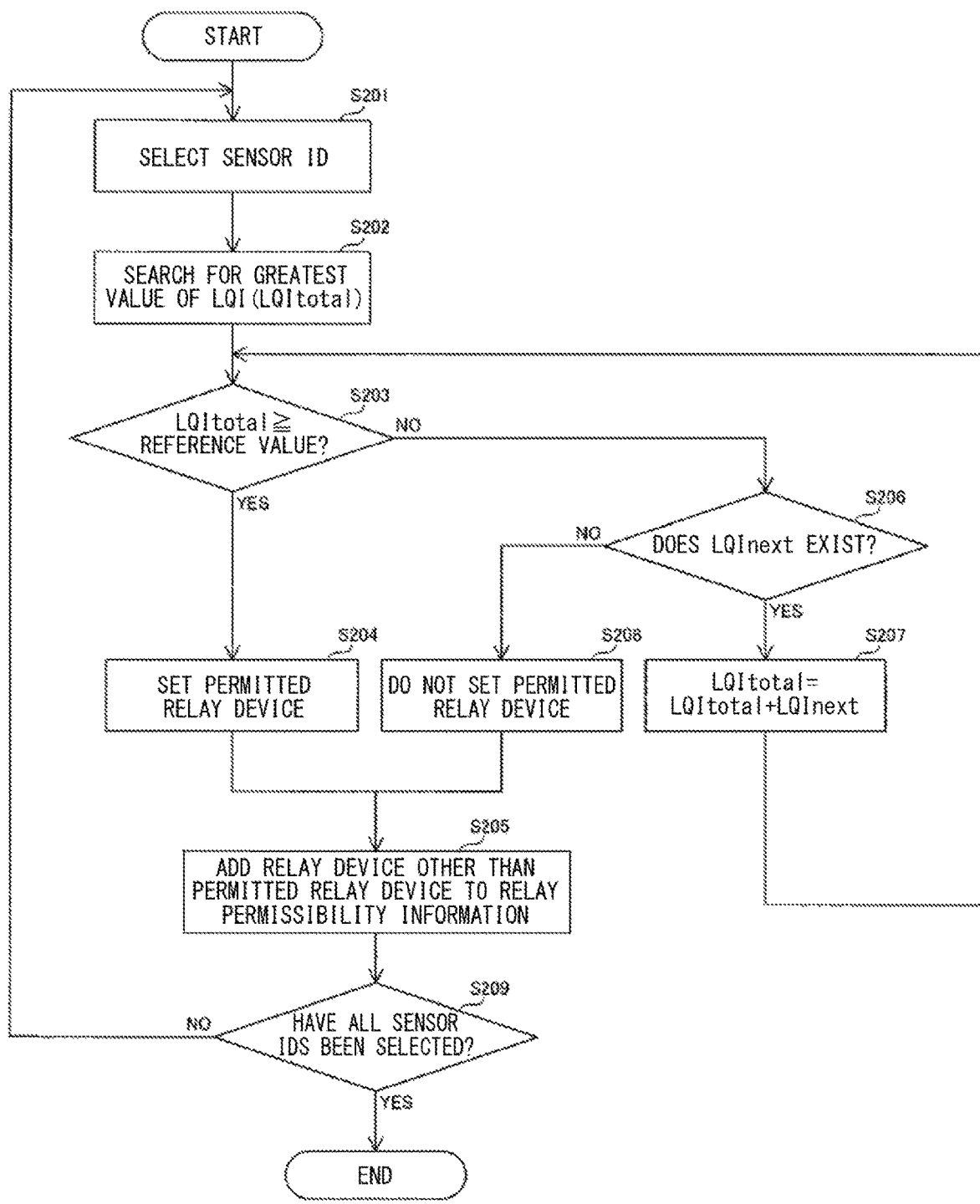
FIG. 12 shows an example of a flow chart describing a procedure of an update process of the relay permissibility information performed by the management device according to the first embodiment of the present disclosure.

FIG. 12 shows an example of a flow chart describing a procedure of the update process of the relay permissibility information performed by the management device according to the first embodiment of the present disclosure.

On the basis of each piece of the communication state information, the management device 161 determines, for each sensor module 1, the number of relay devices 151 that should relay sensor data.

Specifically, with reference to FIG. 12, first, the data processing unit 74 selects a sensor ID for which the update process of the relay permissibility information is to be performed (step S201).

Next, the data processing unit 74 searches for a greatest value of the LQI in the data of the selected sensor ID (step S202).

Next, the data processing unit 74 sets the retrieved greatest value as an LQItotal, and compares the greatest value with a reference value (step S203).

When the LQItotal is not smaller than the reference value (YES in step S203), the data processing unit 74 sets, as "permitted relay device", one or a plurality of relay devices 151 that correspond to the LQItotal (step S204).

Next, the data processing unit 74 adds, to the relay permissibility information, the relay devices 151 other than the permitted relay device among the relay devices 151 that correspond to the selected sensor ID in the management table (step S205).

Meanwhile, when the LQItotal is smaller than the reference value (NO in step S203), the data processing unit 74 searches for an LQInext, which is the next greatest LQI (step S206).

Next, when there is an LQInext (YES in step S206), the data processing unit 74 adds the LQInext to the LQItotal, to produce a new LQItotal (step S207).

Next, the data processing unit 74 compares the new LQItotal with the reference value (step S203).

Meanwhile, when there is no LQInext (NO in step S206), the data processing unit 74 does not set the permitted relay device (step S208).

Next, since there is no relay device 151 set as the permitted relay device, the data processing unit 74 adds, to the relay permissibility information, all the relay devices 151 that correspond to the selected sensor ID (step S205).

Next, the data processing unit 74 determines whether the update process of the relay permissibility information has been performed for all the sensor IDs present in the management table (step S209).

Next, when having performed the update process of the relay permissibility information for all the sensor IDs present in the management table (YES in step S209), the data processing unit 74 ends the update process of the relay permissibility information.

Meanwhile, when there is any sensor ID, in the management table, for which the update process of the relay permissibility information has not been performed (NO in step S209), the data processing unit 74 selects the next sensor ID (step S201).

For example, the data processing unit 74 performs the update process of the relay permissibility information using the management table shown in FIG. 11, and generates relay permissibility information A2 shown in FIG. 6. In this case, for example, the data processing unit 74 has determined the number of relay devices 151 that should relay sensor data for the sensor module 1 having 0001 as the sensor ID, to 2.

The relay permissibility information may be information that enables recognition of a predetermined number of relay devices 151 that should relay sensor data and that have been determined on the basis of the communication state information from each relay device 151. That is, on the basis of each piece of the communication state information, the data processing unit 74 may set a predetermined number of relay devices 151, as the permitted relay device.

Specifically, for example, the data processing unit 74 sets, as the permitted relay device, relay devices 151 that correspond to the greatest two LQIs for each sensor ID, and adds the relay devices 151 other than the permitted relay device, to the relay permissibility information.

With reference to FIG. 9 and FIG. 10 again, the management device 161 transmits the updated relay permissibility information to each relay device 151 (step S105).

Specifically, the data processing unit 74 of the management device 161 updates the relay permissibility information in the storage unit 73, and outputs the updated relay permissibility information A2 to the transmission processing unit 72.

The transmission processing unit 72 divides the relay permissibility information A2 received from the data processing unit 74, for each transmission target relay device 151, causes a packet to include relay permissibility information A1 obtained by the dividing and the ID of the transmission target relay device 151, and wirelessly transmits the packet to the target relay device 151.

For example, in a case where the transmission target is the relay device 151B, the transmission processing unit 72 causes a packet to include, as the relay permissibility information A1, the sensor ID of 0003 that corresponds to the relay device 151B in the relay permissibility information A2 shown in FIG. 6, and wirelessly transmits the packet to the relay device 151B.

For example, in a case where the transmission target is the relay device 151C, the transmission processing unit 72 causes a packet to include, as the relay permissibility information A1, the sensor IDs of 0001 and 0003 that correspond to the relay device 151C in the relay permissibility information A2 shown in FIG. 6, and wirelessly transmits the packet to the relay device 151C.

For example, in a case where the transmission target is the relay device 151D, the transmission processing unit 72 causes a packet to include, as the relay permissibility information A1, the sensor IDs of 0001, 0002, and 0003 that correspond to the relay device 151D in the relay permissibility information A2 shown in FIG. 6, and wirelessly transmits the packet to the relay device 151D.

For example, the transmission processing unit 72 wirelessly transmits information indicating that there is no sensor ID for which relay is not permitted, to the relay device 151A which is not included in the relay permissibility information A2 shown in FIG. 6.

Irrespective of whether or not a target relay device 151 is included in the relay permissibility information A2, the management device 161 may generate a packet including the relay permissibility information A2, and transmit a radio signal including the generated packet, to all the relay devices 151 through multicast, for example.

[Modification]

The management device 161 may be configured to transmit the changed portion of the updated relay permissibility information to each relay device 151. In this case, when there is no change in the content of the relay permissibility information before and after the update process, the management device 161 does not perform the transmitting operation to each relay device 151 with respect to the relay permissibility information.

Specifically, with reference to FIG. 9, the data processing unit 74 of the management device 161 updates the relay permissibility information in the storage unit 73 and outputs the changed portion to the transmission processing unit 72.

For example, when the updated relay permissibility information is the relay permissibility information A2 shown in FIG. 6, and 0003 has been newly added as the sensor ID that corresponds to the relay device 151D, the data processing unit 74 outputs, to the transmission processing unit 72, information indicating that the sensor ID corresponding to the relay device 151D is 0003.

The transmission processing unit 72 generates a packet including the changed portion of the relay permissibility information A2 received from the data processing unit 74, and transmits a radio signal including the generated packet, to a target relay device 151.

More specifically, for example, the transmission processing unit 72 generates a packet including the changed portion and the ID of a transmission target relay device 151, and wirelessly transmits the packet.

The transmission processing unit 72 may extract, from the changed portion, a portion that corresponds to the transmission target relay device 151, cause a packet to include the extracted portion, and wirelessly transmit the packet.

Irrespective of whether or not the target relay device 151 is included in the changed portion of the relay permissibility information A2, the management device 161 may transmit the changed portion of the relay permissibility information A2, to all the relay devices 151 through multicast, for example.

The operation in which the management device 161 creates the relay permissibility information for the first time is similar to the operation of updating the relay permissibility information as described above. Specifically, in FIG. 10 and FIG. 12, with the updating operation replaced by a newly creating operation, and instead of the changed portion of the relay permissibility information, created relay permissibility information may be transmitted.

In this case, for example, on the basis of the reception time of the communication state information, the management device 161 determines whether or not to use the communication state information in creation of relay permissibility information.

Specifically, for example, the data processing unit 74 creates relay permissibility information, by excluding communication state information at any reception time before a predetermined time period or more among the pieces of communication state information in the storage unit 73.

The management device 161 may be configured such that, when one or a plurality of pieces of communication state information satisfy a predetermined condition, the management device 161 does not transmit the relay permissibility information to the relay device 151 even though there is a change in the relay permissibility information. The predetermined condition is that the LQI of the permitted relay device is sufficiently greater than the LQIs of the other relay devices 151, for example.

Specifically, for example, it is assumed that, when the management table at a certain time is the management table in FIG. 11, the management device 161 receives, from the relay device 151C, communication state information indicating that the LQI, in the relay device 151C, of the sensor module 1 having 0001 as the sensor ID, is 190. In this case, the relay device 151B becomes a relay device 151 that is not permitted to perform relaying, in the updated relay permissibility information.

However, since the LQI of the relay device 151B is 150, which is sufficiently large, the management device 161 does not transmit the updated relay permissibility information to the relay device 151B and the relay device 151C.

In the wireless sensor system according to the first embodiment of the present disclosure, the relay device 151 relays sensor data received from another relay device 151, irrespective of the relay permissibility information. However, the present disclosure is not limited thereto. For example, the relay device 151 may be configured not to relay sensor data received from another relay device 151, in accordance with the relay permissibility information.

In the wireless sensor system according to the first embodiment of the present disclosure, the target terminal for which relay permissibility information is to be created or updated is the sensor module 1 from which the relay device 151 has received sensor data. However, the present disclosure is not limited thereto. The target terminal with respect to the relay permissibility information may be one or a plurality of terminals that are set in advance by the management device 161, for example.

In the wireless sensor system according to the first embodiment of the present disclosure, the management device 161 does not transmit the relay permissibility information to a relay device 151 for which one or a plurality of pieces of communication state information satisfy a predetermined condition. However, the present disclosure is not limited thereto. The management device 161 may transmit the relay permissibility information when the relay permissibility information is changed, without a predetermined condition being set, for example.

In the wireless sensor system according to the first embodiment of the present disclosure, on the basis of the reception time of communication state information, the management device 161 determines whether or not to use the communication state information in creation of the relay permissibility information. However, the present disclosure is not limited thereto. For example, irrespective of the reception time of the communication state information, the management device 161 may create relay permissibility information using communication state information stored in the storage unit 43.

In the wireless sensor system according to the first embodiment of the present disclosure, the management device 161 creates relay permissibility information using the value of the greatest LQI or the total value of a plurality of LQIs, the LQI serving as the communication state information (step S207). However, the present disclosure is not limited thereto. For example, the management device 161 may create relay permissibility information using the value of the greatest LQI or the average value of a plurality of LQIs, the LQI serving as the communication state information.

In the wireless sensor system according to the first embodiment of the present disclosure, in creation of relay permissibility information, the management device 161 uses LQI, which is the communication state information, as an index. However, the present disclosure is not limited thereto. For example, in creation of relay permissibility information, the management device 161 may use, as an index, a loss rate in a relay device 151 of a packet transmitted from a sensor module 1.

Figure 13:
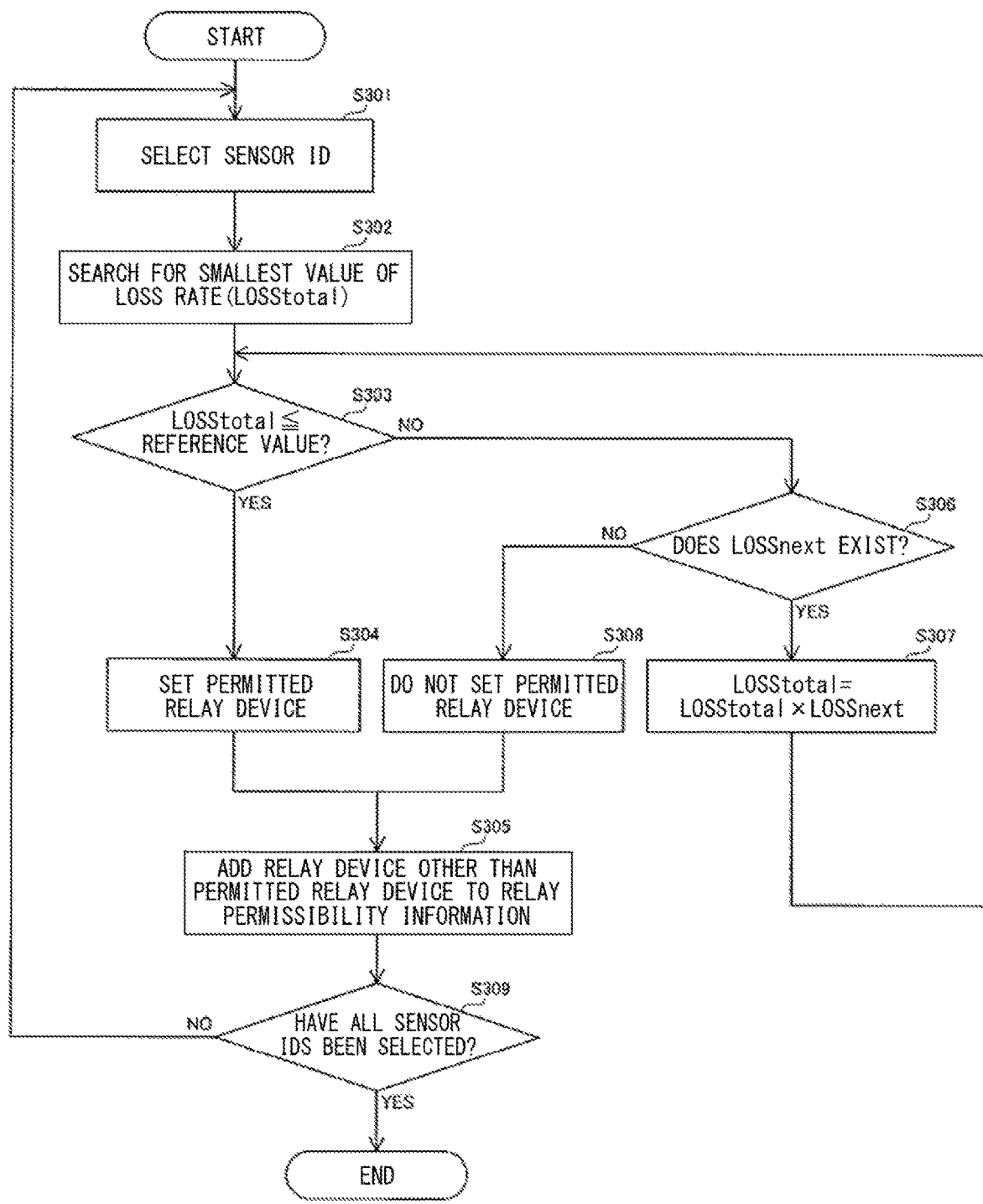
FIG. 13 shows another example of the flow chart describing the procedure of the update process of the relay permissibility information performed by the management device according to the first embodiment of the present disclosure.

FIG. 13 shows another example of a flow chart describing the procedure of the update process of the relay permissibility information performed by the management device according to the first embodiment of the present disclosure.

The management device 161 creates relay permissibility information using, as an index, a loss rate in a relay device 151 of a packet transmitted from a sensor module 1.

Specifically, with reference to FIG. 13, first, the data processing unit 74 selects a sensor ID for which the update process of the relay permissibility information is to be performed (step S301).

Next, the data processing unit 74 searches for a smallest value of the loss rate in the data of the selected sensor ID (step S302).

Next, the data processing unit 74 sets the retrieved smallest value as a LOSStotal, and compares the greatest value with a reference value (step S303).

When the LOSStotal is not greater than the reference value (YES in step S303), the data processing unit 74 sets, as "permitted relay device", one or a plurality of relay devices 151 that correspond to the LOSStotal (step S304).

Next, the data processing unit 74 adds, to the relay permissibility information, the relay devices 151 other than the permitted relay device among the relay devices 151 that correspond to the selected sensor ID in the management table (step S305).

Meanwhile, when the LOSStotal is greater than the reference value (NO in step S303), the data processing unit 74 searches for a LOSSnext, which is the next smallest loss rate (step S306).

Next, when there is a LOSSnext (YES in step S306), the data processing unit 74 multiplies the LOSStotal by the LOSSnext, to produce a new LOSStotal (step S307).

Next, the data processing unit 74 compares the new LOSStotal with the reference value (step S303).

Meanwhile, when there is no LOSSnext (NO in step S306), the data processing unit 74 does not set the permitted relay device (step S308).

Next, the data processing unit 74 adds, to the relay permissibility information, all the relay devices 151 that correspond to the selected sensor ID (step S305).

Next, the data processing unit 74 determines whether the update process of the relay permissibility information has been performed for all the sensor IDs present in the management table (step S309).

Next, when having performed the update process of the relay permissibility information for all the sensor IDs present in the management table (YES in step S309), the data processing unit 74 ends the update process of the relay permissibility information.

Meanwhile, when there is any sensor ID, in the management table, for which the update process of the relay permissibility information has not been performed (NO in step S309), the data processing unit 74 selects the next sensor ID (step S301).

In the wireless sensor system according to the first embodiment of the present disclosure, the first frequency band and the second frequency band are partially or entirely different from each other. However, the present disclosure is not limited thereto. The first frequency band and the second frequency band may overlap each other in the entirety thereof, i.e., the first frequency band and the second frequency band may be the same frequency band. In this case, for example, on the basis of the header information of a packet included in a radio signal, the relay device 151 determines whether the packet is a packet transmitted from a sensor module 1 or a packet transmitted from a relay device.

The wireless terminal device according to the first embodiment of the present disclosure transmits a radio signal through one-way communication. However, the present disclosure is not limited thereto. The wireless terminal device 101 may perform one-way communication in a channel, and may transmit/receive another piece of information to/from a relay device through two-way communication in another channel.

In the wireless sensor system according to the first embodiment of the present disclosure, a predetermined transmission channel in a 920 megahertz band is set as the relay channel for the relay device 151 and the terminal channel for the sensor module 1. However, the present disclosure is not limited thereto. In the wireless sensor system 301, predetermined transmission channels in a plurality of frequency bands that are separated from each other to some extent may be set as the relay channel and the terminal channel.

Specifically, for example, a predetermined transmission channel in a 920 megahertz band may be set as the relay channel for the relay device 151, and a predetermined transmission channel in a 2.4 gigahertz band or a 5 gigahertz band may be set as the terminal channel for the sensor module 1. Alternatively, for example, a predetermined transmission channel in a 2.4 gigahertz band or a 5 gigahertz band may be set as the relay channel for the relay device 151, and a predetermined transmission channel in a 920 megahertz band may be set as the terminal channel for the sensor module 1.

In the wireless sensor system according to the first embodiment of the present disclosure, the management device 161 directly transmits/receives information to/from one relay device 151. However, the present disclosure is not limited thereto. The management device 161 may directly transmit/receive information to/from a plurality of relay devices 151.

In the wireless sensor system according to the first embodiment of the present disclosure, the management device 161 and the relay device 151 are separate devices. However, the present disclosure is not limited thereto. The management device 161 may include a part or the entirety of the relay device 151. In this case, the management device 161 may directly transmit/receive information to/from one relay device 151 provided outside the management device 161, or may directly transmit/receive information to/from a plurality of relay devices 151 provided outside the management device 161.

Meanwhile, when a packet is communicated between communication devices via a wireless ad hoc network, the packet is transmitted between the communication devices through a transmission path via one or a plurality of relay devices that relay the packet.

Such multi-hop communication is used not only in a wireless ad hoc network but also in a wired network, and is often used by a single application such as a smart meter for measuring electric power, for example.

In contrast to this, in an M2M system expected to be increasingly used in the future, a configuration is conceivable in which a management device aggregates results of measurements by sensors. In such a configuration, a packet transmitted from a wireless terminal device is transmitted to the management device via one or a plurality of relay devices.

For example, when a large number of wireless terminal devices and relay devices are provided, data loss is increased due to radio-frequency interference between wireless communication devices and relay devices. Thus, it is required to identify the cause for such interference and remove the interference. However, identifying the cause requires elaborate investigations, which results in a lot of work. A technology is required that can favorably transmit data even when a large number of wireless terminal devices and relay devices are provided in a wireless communication network.

In contrast to this, in the wireless sensor system according to the first embodiment of the present disclosure, one or a plurality of wireless terminal devices 101 each transmit data including sensor information indicating a result of measurement by a sensor 21. A plurality of relay devices 151 relay sensor data received from the wireless terminal devices 101, to the management device 161 or another relay device 151. Each of the plurality of relay devices 151 transmits, to the management device 161, communication state information indicating the state of communication from one or a plurality of the wireless terminal devices 101 to the relay device 151. On the basis of the communication state information received from each relay device 151, the management device 161 transmits, to a target relay device 151, relay permissibility information that enables discernment, for each target terminal which is one or a plurality of wireless terminal devices 101, as to whether or not relay by the relay device 151 of sensor data from the target terminal is permitted.

In this configuration, a plurality of relay devices 151 each transmit, to the management device 161, communication state information with respect to wireless terminal devices 101, and, on the basis of each piece of the communication state information, the management device 161 determines, for each wireless terminal device 101, whether or not relay of sensor data by each relay device 151 is permitted. Therefore, a relay device 151 for which the communication state is relatively good can be selected for each wireless terminal device 101, to relay sensor data. Thus, in a configuration in which data transmitted from a wireless terminal device is transmitted via one or a plurality of relay devices, increase in traffic can be suppressed.

In the wireless sensor system according to the first embodiment of the present disclosure, the relay device 151 relays sensor data received from another relay device 151, irrespective of the relay permissibility information.

With this configuration, the data received by a relay device 151 for which the communication state is good is prevented from being discarded in another relay device 151. Thus, the sensor data is allowed to reach the management device 161 in a more assured manner.

In the wireless sensor system according to the first embodiment of the present disclosure, the target terminal is the wireless terminal devices 101 from which sensor data has been received by the relay device 151.

With this configuration, a wireless terminal device 101 of which the communication state should be notified of to the management device 161 can be appropriately selected, and traffic in the wireless sensor system 301 can be suppressed.

In the wireless sensor system according to the first embodiment of the present disclosure, the relay permissibility information indicates a wireless terminal device 101 for which sensor data should not be relayed.

With this configuration, for example, in a case where a new wireless terminal device 101 has been added to the wireless sensor system 301, until any relay device 151 permitted to relay data from the wireless terminal device 101 becomes discernable, relay devices 151 having received data from the wireless terminal device 101 can relay the data. Accordingly, even in an initial state where the content of relay permissibility information is insufficient, data is allowed to reach the management device 161.

In the wireless sensor system according to the first embodiment of the present disclosure, the relay permissibility information indicates a combination, of a wireless terminal device 101 and a relay device 151, for which sensor data should not be relayed.

With this configuration, when the relay permissibility information is transmitted to each relay device 151 through multicast, the relay permissibility information in each relay device 151 can be updated simultaneously.

In the wireless sensor system according to the first embodiment of the present disclosure, the relay permissibility information is information that enables recognition of a predetermined number of relay devices 151 that should relay sensor data and that have been determined on the basis of each piece of the communication state information.

Since the number of relay devices 151 that are permitted to perform relaying is fixed, the process of selecting relay devices 151 can be simplified.

In the wireless sensor system according to the first embodiment of the present disclosure, on the basis of each piece of the communication state information, the management device 161 determines, for each target terminal, the number of relay devices 151 that should relay sensor data.

With this configuration, for example, when the communication quality is good, the number of relay devices 151 that are permitted to perform relaying is reduced to suppress traffic, and when the communication quality is bad, the number of relay devices 151 that are permitted to perform relaying is increased to enhance the possibility of the sensor data reaching the management device 161.

In the wireless sensor system according to the first embodiment of the present disclosure, the management device 161 does not transmit the relay permissibility information, to a relay device 151 for which one or a plurality of pieces of communication state information satisfy a predetermined condition.

With this configuration, since the frequency of transmitting the relay permissibility information can be reduced, increase in traffic can be suppressed.

In the wireless sensor system according to the first embodiment of the present disclosure, on the basis of the reception time of communication state information, the management device 161 determines whether or not to use the communication state information in creation or update of the relay permissibility information.

With this configuration, for example, in a case where a wireless terminal device 101 has moved and a relay device 151 permitted to perform relaying becomes no longer able to receive sensor data from the wireless terminal device 101, the content of the relay permissibility information can be appropriately updated.

In the wireless sensor system according to the first embodiment of the present disclosure, each wireless terminal device 101 transmits a radio signal including sensor data and in a first frequency band through one-way communication. Each relay device 151 transmits a radio signal including sensor data and in a second frequency band that is partially or entirely different from the first frequency band.

Thus, since the first frequency band to be used in transmission of a radio signal by the wireless terminal device 101, and the second frequency band to be used in transmission of a radio signal by the relay device 151 are different from each other, radio-frequency interference between the relay device 151 and the wireless terminal device 101 can be suppressed. Accordingly, even in a case where a large number of wireless terminal devices 101 and relay devices 151 are provided without performing elaborate investigation, increase in data loss due to interference can be prevented.

In the management device according to the first embodiment of the present disclosure, the reception processing unit 71 receives, from a plurality of relay devices 151, communication state information indicating a state of communication, which is from one or a plurality of wireless terminal devices 101 to each relay device 151. Each wireless terminal device 101 is configured to transmit data including sensor information indicating a result of measurement by the sensor 21. Each relay device 151 is configured to relay, to the management device 161 or another relay device 151, the sensor data received. On the basis of the communication state information received from each relay device 151, the transmission processing unit 72 transmits, to a target relay device 151, relay permissibility information that enables discernment, for each target terminal which is one or a plurality of wireless terminal devices 101, as to whether or not relay by the relay device 151 of sensor data from the target terminal is permitted.

In this configuration, a plurality of relay devices 151 each transmit, to the management device 161, communication state information with respect to wireless terminal devices 101, and, on the basis of each piece of the communication state information, the management device 161 determines, for each wireless terminal device 101, whether or not relay of sensor data by each relay device 151 is permitted. Therefore, a relay device 151 for which the communication state is relatively good can be selected for each wireless terminal device 101, to relay sensor data. Thus, in a configuration in which data transmitted from a wireless terminal device is transmitted via one or a plurality of relay devices, increase in traffic can be suppressed.

Next, another embodiment of the present disclosure is described with reference to the drawings. In the drawings, the same or corresponding parts are denoted by the same reference signs, and description thereof is not repeated.

Second Embodiment

The present embodiment relates to a management device and a relay device for which the content of the relay permissibility information is different from that for the management device and the relay device according to the first embodiment. The management device and the relay device are the same as those in the first embodiment except for the contents described below.

The relay permissibility information in the wireless sensor system according to a second embodiment of the present disclosure indicates a transmission source sensor module 1, i.e., a wireless terminal device 101, for which sensor data should be relayed, for example.

Similar to the wireless sensor system according to the first embodiment of the present disclosure, the transmission processing unit 72 in the management device 161 divides relay permissibility information A4 for each transmission target relay device 151, causes a packet to include relay permissibility information A3 obtained by the dividing, and wirelessly transmits the packet.

For example, in the relay device 151B, when the higher-order-side communication processing unit 42 has received a packet including sensor IDs of 0001 and 0002 as the relay permissibility information A3, the higher-order-side communication processing unit 42 stores the sensor IDs included in the received packet into the storage unit 43. On the basis of the stored relay permissibility information A3, the higher-order-side communication processing unit 42 determines whether or not relay of sensor data from sensor modules 1 is permitted.

The data processing unit 44 deletes sensor data that is stored in the storage unit 43 and of which the sensor ID does not match the sensor ID indicated in the relay permissibility information A3 stored in the storage unit 43.

Specifically, for example, the data processing unit 44 of the relay device 151B leaves sensor data having 0001 and 0002 as the sensor IDs in the storage unit 43, and deletes the other sensor data of which the sensor IDs are other than 0001 and 0002.

Figure 14:
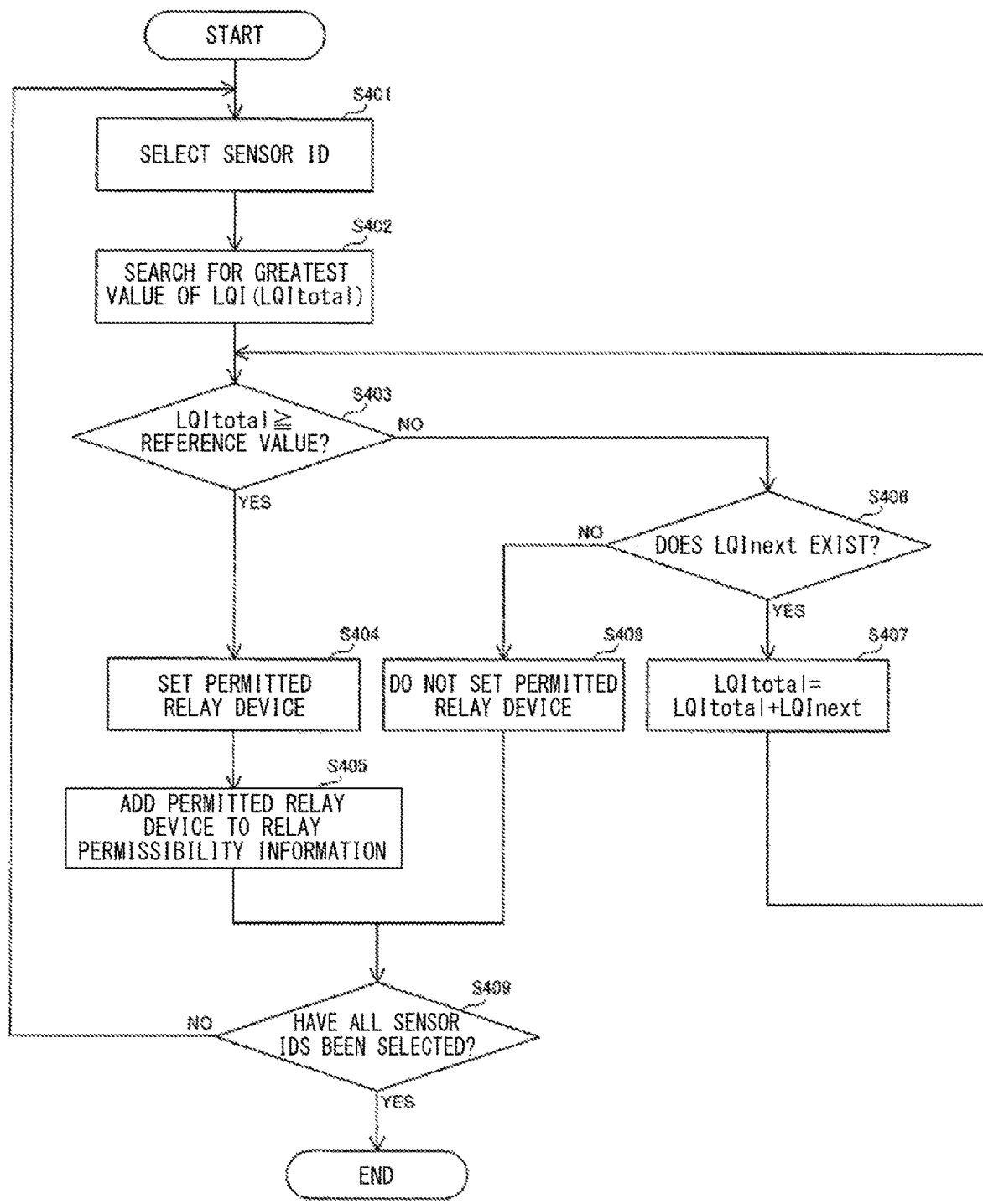
FIG. 14 is a flow chart describing a procedure of a creation process of relay permissibility information performed by a management device according to a second embodiment of the present disclosure.

FIG. 14 is a flow chart describing a procedure of a creation process of relay permissibility information performed by the management device according to the second embodiment of the present disclosure.

With reference to FIG. 14, the creation process of relay permissibility information performed by the management device according to the second embodiment of the present disclosure is different from the creation process of relay permissibility information performed by the management device according to the first embodiment of the present disclosure shown in FIG. 12, in that an operation of adding a relay device 151 to the relay permissibility information (step S405) is performed.

More specifically, when the LQItotal is not smaller than a reference value (YES in step S403), the data processing unit 74 sets, as "permitted relay device", one or a plurality of relay devices 151 that correspond to the LQItotal (step S404).

Next, the data processing unit 74 adds the set permitted relay device to the relay permissibility information (step S405).

Meanwhile, when the LQItotal is smaller than the reference value (NO in step S403) and there is no LQInext which is the next greatest LQI (NO in step S406), the data processing unit 74 does not set the permitted relay device (step S408), and determines whether the update process of the relay permissibility information has been performed for all the sensor IDs present in the management table (step S409).

FIG. 15 shows an example of the relay permissibility information in the wireless sensor system according to the second embodiment of the present disclosure.

With reference to FIG. 15, the relay permissibility information may show a correspondence relationship between, i.e., a combination of, a sensor ID and a relay device 151, for which sensor data from the corresponding sensor module 1 should be relayed. This relay permissibility information is the relay permissibility information A4 described above.

The relay permissibility information A4 shown in FIG. 15 is obtained by performing the creation process of relay permissibility information in the wireless sensor system according to the second embodiment of the present disclosure, with use of the management table shown in FIG. 11.

In a relay device 151, when a combination that includes the relay device 151 to which the data processing unit 44 belongs is present in the relay permissibility information A4, the data processing unit 44 deletes sensor data that is stored in the storage unit 43 and of which the sensor ID does not match the sensor ID of the combination.

For example, the data processing unit 44 of the relay device 151B leaves sensor data having 0001 and 0002 as the sensor IDs in the storage unit 43, and deletes sensor data of which the sensor IDs are other than 0001 and 0002.

In the relay device 151, the higher-order-side communication processing unit 42 may create relay permissibility information A3 by extracting, from the received relay permissibility information A4, sensor IDs corresponding to the relay device 151 to which the higher-order-side communication processing unit 42 belongs, and store the created relay permissibility information A3 into the storage unit 43. In this case, on the basis of the stored relay permissibility information A3, the higher-order-side communication processing unit 42 determines whether or not relay of sensor data from sensor modules 1 is permitted.

As described above, in the wireless sensor system according to the second embodiment of the present disclosure, the relay permissibility information indicates the wireless terminal device 101 for which sensor data should be relayed.

With this configuration, for example, when a new wireless terminal device 101 has been added to the wireless sensor system 301, only the relay device 151 that has been permitted to relay data from the wireless terminal device 101 relays the data. Therefore, the data from the new wireless terminal device 101 received by a plurality of relay devices 151 is prevented from being relayed, and increase in traffic can be suppressed.

In the wireless sensor system according to the second embodiment of the present disclosure, the relay permissibility information indicates a combination, of a wireless terminal device 101 a relay device 151, for which sensor data should be relayed.

With this configuration, when the relay permissibility information is transmitted to each relay device 151 through multicast, the relay permissibility information in each relay device 151 can be updated simultaneously.

The other configurations and operations are the same as those in the wireless sensor system according to the first embodiment, and thus, detailed description thereof is not repeated.

It should be understood that the above embodiments are merely illustrative and not restrictive in all aspects. The scope of the present disclosure is defined by the scope of the claims rather than the above description, and is intended to include meaning equivalent to the scope of the claims and all modifications within the scope.

The above description includes the features in the additional note below.

[Additional Note 1]

A wireless sensor system including:

one or a plurality of wireless terminal devices each configured to transmit data including sensor information indicating a result of measurement by a sensor;

a management device; and a plurality of relay devices configured to relay the data received from the wireless terminal devices, to the management device or another relay device, wherein each of the plurality of relay devices transmits, to the management device, communication state information indicating a state of communication from one or a plurality of the wireless terminal devices to the relay device, on the basis of the communication state information received from each relay device, the management device transmits, to a relay device as a target, relay permissibility information that enables discernment, for each target terminal which is one or a plurality of the wireless terminal devices, as to whether or not relay by the relay device of the data from the target terminal is permitted, on the basis of the communication state information received from each relay device, the management device transmits, to a relay device as a target, relay permissibility information that enables discernment, for each of a part or all of the wireless terminal devices, as to whether or not relay by the relay device of the data from the wireless terminal device is permitted, the relay device periodically or non-periodically transmits the communication state information to the management device, and every time the management device receives the communication state information, the management device updates the relay permissibility information on the basis of the communication state information that has been newly received.

[Additional Note 2]

A management device including:

a reception processing unit configured to receive, from a plurality of relay devices, communication state information indicating a state of communication, the communication being from one or a plurality of wireless terminal devices to each relay device, each wireless terminal device being configured to transmit data including sensor information indicating a result of measurement by a sensor, each relay device being configured to relay, to the management device or another relay device, the data received; and a transmission processing unit configured to, on the basis of the communication state information received from each relay device, transmit, to a relay device as a target, relay permissibility information that enables discernment, for each target terminal which is one or a plurality of the wireless terminal devices, as to whether or not relay by the relay device of the data from the target terminal is permitted, wherein the reception processing unit receives the communication state information periodically or non-periodically transmitted by each relay device, and the management device further includes a data processing unit configured to, every time the data processing unit receives the communication state information, update the relay permissibility information on the basis of the communication state information that has been newly received.

REFERENCE SIGNS LIST 1 sensor module
21 sensor
22 data creation unit
23 transmission processing unit
41 sensor-side communication processing unit
42 higher-order-side communication processing unit
43, 73 storage unit
44, 74 data processing unit
71 reception processing unit
72 transmission processing unit
81 CPU
82 wireless module
83 antenna
101 wireless terminal device
151 relay device
161 management device
301 wireless sensor system

The invention claimed is:

1. A wireless sensor system comprising:
one or a plurality of wireless terminal devices each configured to transmit, through one-way communication, sensor data including sensor information indicating a result of measurement by a sensor;
a management device; and
a plurality of relay devices each configured to relay the sensor data received from the wireless terminal devices, to the management device or another relay device of the plurality of relay devices, each of the plurality of relay devices transmits, to the management device, communication state information indicating a state of communication from the one or the plurality of the wireless terminal devices to the respective relay device, the communication state information being generated based on the sensor data received from the one or the plurality of wireless terminal devices through one-way communication,
wherein, based on the communication state information received from each relay device, the management device transmits, to at least one relay device of the plurality of relay devices as a target, relay permissibility information that determines, for each target terminal which is at least one of the one or the plurality of wireless terminal devices, whether relay of the sensor data from the target terminal, by the at least one relay device, is permitted.

2. The wireless sensor system according to claim 1, wherein
the relay device relays the sensor data received from another relay device, irrespective of the relay permissibility information.

3. The wireless sensor system according to claim 1, wherein
the target terminal is the wireless terminal devices from which the sensor data has been received by the at least one relay device.

4. The wireless sensor system according to claim 1, wherein
the relay permissibility information indicates at least one wireless terminal device of the one or the plurality of wireless terminal devices for which the sensor data is not to be relayed.

5. The wireless sensor system according to claim 4, wherein
the relay permissibility information indicates a combination of the at least one wireless terminal device and the at least one relay device of the plurality of relay devices, the combination being for which the sensor data is not to be relayed.

6. The wireless sensor system according to claim 1, wherein
the relay permissibility information indicates at least one wireless terminal device of the one or the plurality of wireless terminal devices for which the sensor data is not to be relayed.

7. The wireless sensor system according to claim 6, wherein
the relay permissibility information indicates a combination of the at least one wireless terminal device and at least one relay device of the plurality of relay devices, the combination being for which the sensor data is not to be relayed.

8. The wireless sensor system according to claim 1, wherein
the relay permissibility information enables recognition of a predetermined number of the plurality of relay devices that relay the sensor data and that have been determined based on each piece of the communication state information.

9. The wireless sensor system according to claim 1, wherein
based on each piece of the communication state information, the management device determines, for each target terminal, a number of the plurality of relay devices that relay the sensor data.

10. The wireless sensor system according to claim 1, wherein
the management device does not transmit the relay permissibility information to at least one relay device of the plurality of relay devices for which one or a plurality of pieces of the communication state information satisfy a predetermined condition.

11. The wireless sensor system according to claim 1, wherein
based on a reception time of the communication state information, the management device determines whether to use the communication state information in creation or update of the relay permissibility information.

12. The wireless sensor system according to claim 1, wherein:
each wireless terminal device transmits a radio signal including the sensor data and in a first frequency band through one-way communication, and
each relay device transmits a radio signal including the sensor data and in a second frequency band that is partially or entirely different from the first frequency band.

13. A management device comprising:
one or more processors configured to:
receive, from each of a plurality of relay devices, communication state information indicating a state of communication from one or a plurality of wireless terminal devices to each relay device of a plurality of relay devices, each wireless terminal device being configured to transmit, through one-way communication, sensor data including sensor information indicating a result of measurement by a sensor, each relay device being configured to relay, to the management device or another relay device, the sensor data received, the communication state information being generated based on the sensor data received from the one or the plurality of wireless terminal devices through one-way communication; and
based on the communication state information received from each relay device, transmit, to at least one relay device of the plurality of relay devices as a target, relay permissibility information that determines, for each target terminal which is at least one of the one or the plurality of the wireless terminal devices, whether relay of the sensor data from the target terminal, by the at least one relay device, is permitted.

14. The wireless sensor system according to claim 1, wherein
the relay permissibility information indicates two or more relay devices of the plurality of relay devices to relay the sensor data, which have received the sensor data from the target terminal.

15. A non-transitory computer readable storage medium storing a computer program to be used in a management device, the computer program causing a computer to perform:
receiving, from a plurality of relay devices, communication state information indicating a state of communication from one or a plurality of wireless terminal devices to each relay device of the plurality of relay devices, each wireless terminal device being configured to transmit, through one-way communication, sensor data including sensor information indicating a result of measurement by a sensor, each relay device being configured to relay, to the management device or another relay device of the plurality of relay devices, the sensor data received, the communication state information being generated based on the sensor data received from the one or the plurality of wireless terminal devices through one-way communication; and
based on the communication state information received from each relay device, transmitting, to at least one relay device of the plurality of relay devices as a target, relay permissibility information that determines, for each target terminal which is at least one of the one or the plurality of wireless terminal devices, whether relay of the sensor data from the target terminal, by the at least one relay device, is permitted.

* * * * *